US012566509B2

(12) United States Patent
    Bowman et al.

(10) Patent No.: US 12,566,509 B2
(45) Date of Patent: Mar. 3, 2026

(54) INERTIALLY ISOLATED SPATIAL CONTROL

(71) Applicant: Tomahawk Robotics, Inc., Melbourne, FL (US)

(72) Inventors: Michael E. Bowman, Satellite Beach, FL (US); William S. Bowman, Melbourne, FL (US); Daniel R. Hedman, Palm Bay, FL (US); Matthew D. Summer, Melbourne, FL (US); Andrew D. Falendysz, Grant, FL (US); Kevin Makovy, West Melbourne, FL (US); Michael W. Holt, Smyrna, GA (US)

(73) Assignee: Tomahawk Robotics, Inc., Melbourne, FL (US)

( * ) Notice: Subject to any disclaimer, the term of this patent is extended or adjusted under 35 U.S.C. 154(b) by 0 days.

(21) Appl. No.: 19/014,558

(22) Filed: Jan. 9, 2025

(65) Prior Publication Data

US 2025/0147598 A1    May 8, 2025

Related U.S. Application Data

(63) Continuation of application No. 18/311,370, filed on May 3, 2023, now Pat. No. 12,223,124, which is a
(Continued)

(51) Int. Cl.
    *G06F 3/01* (2006.01)
    *G05D 1/00* (2006.01)
    (Continued)

(52) U.S. Cl.
    CPC ......... *G06F 3/0346* (2013.01); *G05D 1/0016* (2013.01); *G05D 1/0038* (2013.01); *G05D 1/223* (2024.01); *G05D 1/2247* (2024.01)

(58) Field of Classification Search
    None
    See application file for complete search history.

(56) References Cited

U.S. PATENT DOCUMENTS

| 2011/0080339 A1* | 4/2011 | Sun | G06F 3/017 |
| | | | 345/157 |
| 2013/0317648 A1 | 11/2013 | Assad | |
| 2018/0114058 A1* | 4/2018 | Kahn | G06V 40/113 |

FOREIGN PATENT DOCUMENTS

EP    4261642 A1    10/2023

OTHER PUBLICATIONS

Summons to Attend Oral Proceedings issued Feb. 7, 2025, in EP Application No. 22192511.8 (12 pages).

\* cited by examiner

*Primary Examiner* — Carl Adams
(74) *Attorney, Agent, or Firm* — Perkins Coie LLP

(57) ABSTRACT

Methods and systems are described herein for detecting motion-induced errors received from inertial-type input devices and for generating accurate vehicle control commands that account for operator movement. These methods and systems may determine, using motion data from inertial sensors, whether the hand/arm of the operator is moving in the same motion as the body of the operator, and if both are moving in the same way, these systems and methods may determine that the motion is not intended to be a motion-induced command. However, if the hand/arm of the operator is moving in a different motion from the body of the operator, these methods and systems may determine that the operator intended the motion to be a motion-induced command to a vehicle.

20 Claims, 7 Drawing Sheets

Related U.S. Application Data continuation of application No. 17/720,130, filed on Apr. 13, 2022, now Pat. No. 11,675,445.

(51) Int. Cl.

| | | |
|---|---|---|
| *G05D 1/223* | (2024.01) | |
| *G05D 1/224* | (2024.01) | |
| *G06F 3/0346* | (2013.01) | |

303

306

309

700

Receive first motion data from a controller
702

Determine that the first motion data corresponds to a candidate motion-induced command
704

Receive second motion data from an inertial sensor
706

Determine that the first motion data matches the second motion data
708

Determine that the candidate motion-induced command corresponds to a motion-induced error
710

INERTIALLY ISOLATED SPATIAL CONTROL

CROSS-REFERENCE TO RELATED APPLICATION(S)

This application is a continuation of U.S. patent application Ser. No. 18/311,370, filed May 3, 2023 (now U.S. Pat. No. 12,223,124 issued Feb. 11, 2025), which is a continuation of U.S. patent application Ser. No. 17/720,130, filed Apr. 13, 2022 (now U.S. Pat. No. 11,675,445 issued Jun. 13, 2023). The content of the foregoing application is incorporated herein in its entirety by reference.

BACKGROUND

Stable and reliable robotic systems are becoming increasingly common. This has contributed to the recent advancement and proliferation of unmanned system technologies, including ground-based systems, aerial-based systems, and/or maritime-based systems. Various control methods are available to control unmanned systems, which are sometimes referred to as unmanned vehicles. Some control methods include motion-induced control systems. An operator may have a controller attached to an operator's hand and the operator may use hand gestures or motions to control unmanned vehicles. For example, an operator may use a particular hand gesture to instruct an unmanned vehicle to move in a particular direction or perform a particular function. A controller of this type may rely on inertial sensors to detect hand/arm movements and generate various commands based on those movements. However, these control systems may have issues when the operator is moving (e.g., walking, running) or when an operator is riding onboard a vehicle (e.g., a car or a helicopter). Thus, the operator's movement may interfere with accurate control of the unmanned vehicles.

SUMMARY

Therefore, methods and systems are described herein for detecting motion-induced errors received from inertial-type input devices and for generating accurate vehicle control commands that account for operator movement. That is, these methods and systems may determine, using motion data from inertial sensors, whether the hand/arm of the operator is moving in the same motion as the body of the operator and if both are moving in the same way, common-mode, these systems and methods may determine that the motion is not intended to be a motion-induced command. However, if the hand/arm of the operator is moving in a different motion from the body of the operator, these methods and systems may determine that the operator intended the motion to be a motion-induced command to a vehicle. For example, if the operator quickly turns in a particular direction, that motion may be detected by both the hand controller and another inertial sensor attached, for example, to the operator's torso or chest. Because that motion is detected by both devices as the same motion, these methods and systems may determine that the operator does not intend this to be a motion-induced command to the unmanned system. However, if the operator makes a particular movement with the hand but the torso does not move, these methods and systems may determine that the motion may be intended as a motion-induced command.

In some embodiments, a motion identification system may be used to perform the operations described herein. In some embodiments, the motion identification system may reside on a controller that an operator may use to control one or more unmanned vehicles. In some embodiments, the motion identification system may reside on another suitable device (e.g., a device attached to an operator such as a mobile phone or a vehicle that the operator is traveling in).

The motion identification system may receive first motion data from a controller. The first motion data may include a first acceleration and a first angular velocity. In some embodiments, the motion data may include a heading. For example, the controller may be an unmanned vehicle controlling device that includes an inertial sensor and receives motion-induced commands to control one or more unmanned vehicles. Furthermore, the first inertial sensor may generate measurements of acceleration and angular velocity of the controller. In some embodiments, the first inertial sensor may generate heading information as part of first motion data.

The motion identification system may attempt to match the received motion data to a particular command. Thus, the motion identification system may determine that the first motion data corresponds to a candidate motion-induced command. The controller may support a plurality of motion-induced commands based on the operator's movement of the controller. For example, if the operator moves his or her hand in a particular direction with a particular motion, the controller may interpret that motion as a command to an unmanned vehicle (e.g., fly in the direction of the motion).

The motion identification system may also receive, from an inertial sensor, second motion data. The second motion data may include a second acceleration and a second angular velocity. In some embodiments, the second motion data included in the motion identification system may also include a heading, measured using a magnetometer. Thus, the inertial sensor may include a magnetometer. The inertial sensor may be a second inertial sensor in the motion identification system that is being worn by an operator. The inertial sensor may measure the linear and angular acceleration(s), velocity(ies), and/or position(s) of a torso of the operator. In some embodiments, angular and linear position and velocity may be derived mathematically from a measurement of acceleration rather than sensed directly. In some embodiments, for example, if the operator is located in a vehicle, this second inertial sensor may be attached to the vehicle or another object representing a frame of reference.

The motion identification system may then use the first motion data and the second motion data to determine whether the motion is in fact a command or an error. Thus, the motion identification system may determine, based on the first set of accelerations, the second set of accelerations, the first set angular velocities, and the second set of angular velocities, that the first motion data matches the second motion data. For example, the motion identification system may generate an acceleration difference based on subtracting the second acceleration from the first acceleration and may generate an angular velocity difference based on subtracting the second angular velocity from the first angular velocity. The motion identification system may then determine that the acceleration difference does not meet an acceleration threshold and/or the angular velocity difference does not meet an angular velocity threshold. Based on determining that the acceleration difference does not meet the acceleration threshold and the angular velocity difference does not meet the angular velocity threshold, the motion identification system may determine that the first motion data matches the second motion data and therefore no commands need to be sent to the unmanned system. In some embodiments, the motion identification system may use a heading received from the controller and a heading received from the inertial sensor in the determination of whether motion is in fact a command.

The motion identification system may, based on determining that the first motion data matches the second motion data, determine that the candidate motion-induced command corresponds to a motion-induced error. The motion identification system may then refrain from transmitting the candidate motion-induced command to one or more vehicles.

In some embodiments, the motion identification system may, based on determining that the first motion data does not match the second motion data, generate a motion-induced command and transmitting the motion-induced command to one or more unmanned vehicles. For example, the motion identification system may generate a third acceleration based on subtracting the second acceleration from the first acceleration and may generate a third angular velocity based on subtracting the second angular velocity from the first angular velocity. Thus, the motion identification system may generate the motion-induced command based on the third acceleration and the third angular velocity.

In some embodiments, the controller may stop generating commands to be sent to the one or more unmanned vehicles based on received motion data. For example, based on the received motion data, the controller may determine that both inertial sensors are detecting 19.6 meters per second squared (2 Gs) of acceleration. At that point, the motion identification system may determine, in view of such high acceleration, that further commands to the unmanned vehicles should be suspended. Thus, the motion identification system may determine that the first acceleration meets an acceleration threshold, or the first angular velocity meets an angular velocity threshold and based on determining that the first acceleration meets the acceleration threshold or the first angular velocity meets the angular velocity threshold, stop detection of new motion-induced commands from the controller.

In some embodiments, the motion detection system may enable the operator to restart detection of new motion-induced commands. Thus, the motion detection system may generate, for display on the controller, a selectable option to enable detecting the new motion-induced commands, and in response to receiving a selection of the selectable option, enable detection of the new motion-induced commands.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
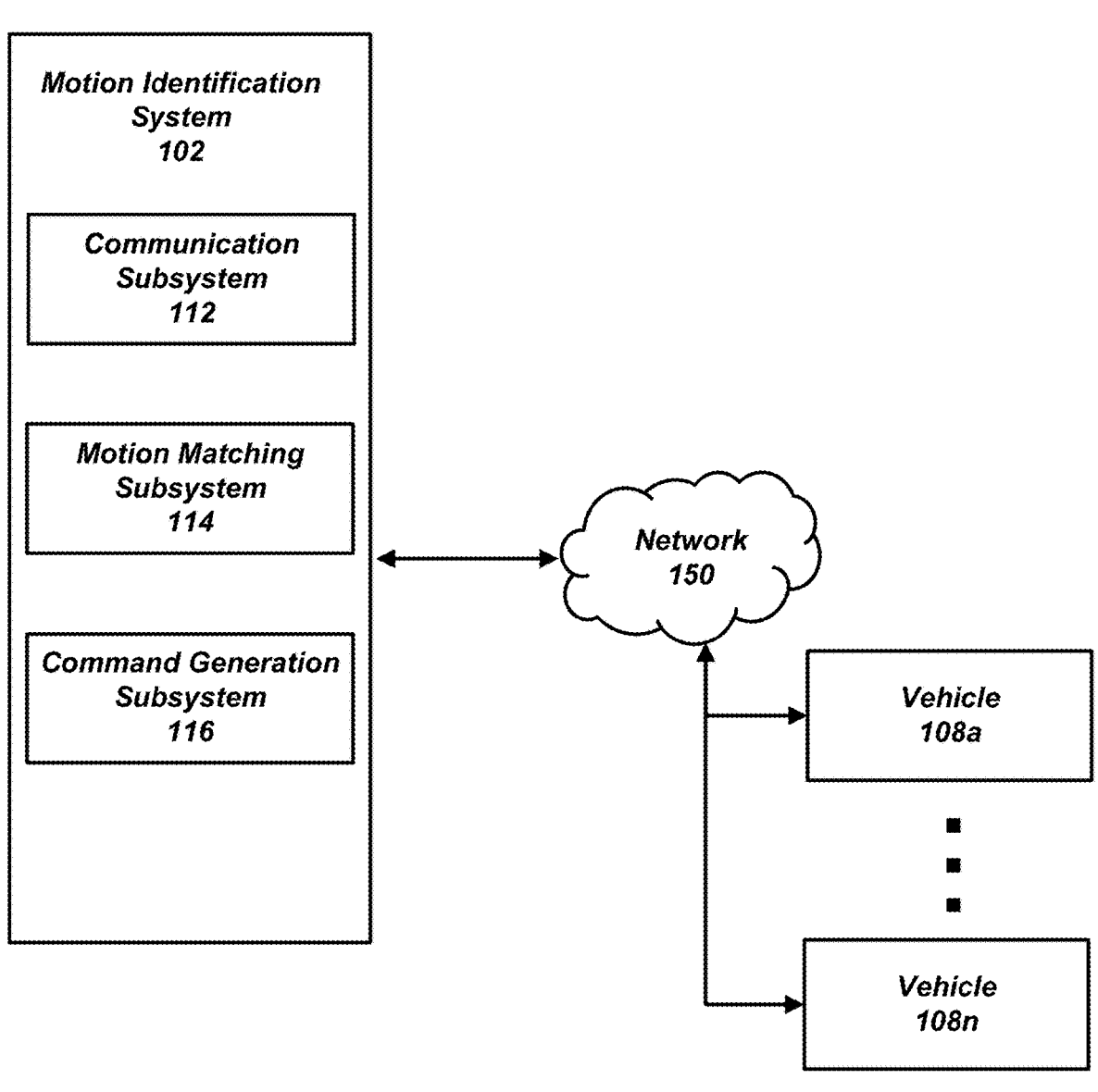
FIG. 1 shows an illustrative system for detecting motion-induced errors received from inertial-type input devices, in accordance with one or more embodiments of this disclosure.

FIG. 1 is an example of environment 100 for detecting motion-induced errors received from inertial-type input devices. Environment 100 includes motion identification system 102 and vehicles 108a-108n (e.g., unmanned vehicles) connected via network 150. Motion identification system 102 may execute instructions for detecting motion-induced errors received from inertial-type input devices. Motion identification system 102 may include software, hardware, or a combination of the two. For example, motion identification system 102 may reside on a controller device (e.g., a vehicle controller) that uses inertial-type input to receive commands for one or more vehicles (e.g., unmanned vehicles). In some embodiments, one or more components of motion identification system 102 may reside on other suitable devices.

Network 150 may be a local area network, a wide area network (e.g., the Internet), or a combination of the two. Vehicles 108a-108n may be unmanned vehicles, including aerial vehicles, land vehicles, and/or maritime vehicles. In some embodiments, vehicles may be manned vehicles that may be controlled by a controller.

Motion identification system 102 may receive first motion data from a controller. The first motion data may include a first acceleration and a first angular velocity. In some embodiments, motion identification system 102 may be part of the controller itself (e.g., may be hosted in the same housing as the controller). Thus, motion identification system 102 may receive the first motion data over a physical connection. In some embodiments, motion identification system may receive a heading as part of the motion data.

The controller may be a vehicle controller that enables an operator to control one or more vehicles (e.g., unmanned vehicles). The controller may be designed to receive motion-induced commands to control unmanned vehicles (e.g., one or more unmanned vehicles). The controller may include an inertial sensor that may be used to detect the operator's commands. The inertial sensor may measure linear and/or angular acceleration, velocity, and/or position of the controller. In some embodiments, the inertial sensor may also generate a heading relative to geographic or magnetic North.

Figure 2:
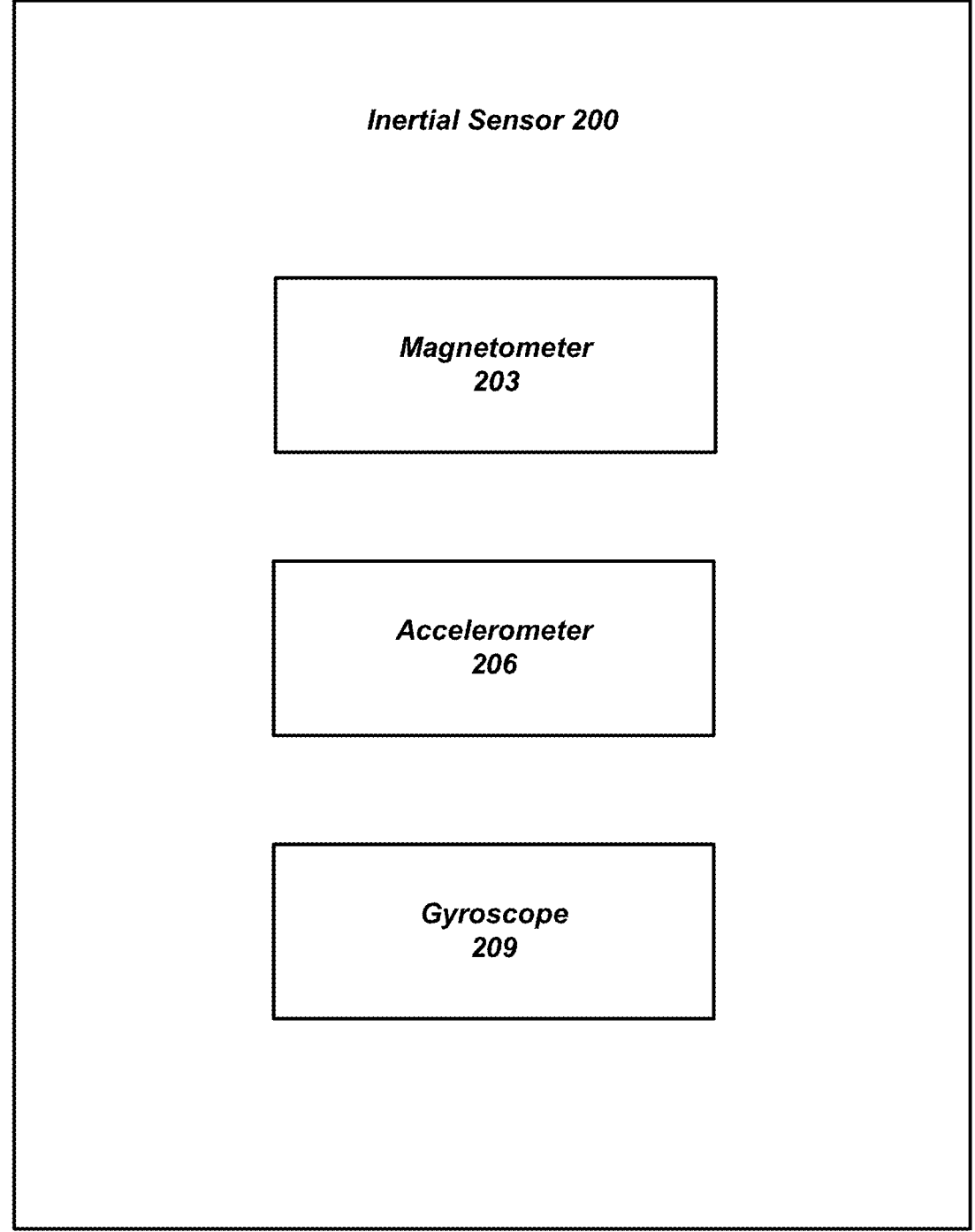
FIG. 2 illustrates an example of an inertial sensor, in accordance with one or more embodiments of this disclosure.

FIG. 2 illustrates an example of an inertial sensor 200. Inertial sensor 200 may include a magnetometer 203, an accelerometer 206 and/or gyroscope 209. In some embodiments, inertial sensor 200 may include one or more of these instruments. The magnetometer 203 may be used to determine an orientation and, thereby, the heading of where the controller is facing. Accelerometer 206 may be used to measure acceleration of the controller and the gyroscope may measure the angular velocity of the controller.

In some embodiments, motion identification system 102 may receive the first motion data using communication subsystem 112. Communication subsystem 112 may include software components, hardware components, or a combination of both. For example, communication subsystem 112 may include a network card (e.g., a wireless network card/ processor) that is coupled with software to drive the card/ processor. The network card may be built into a device hosting the motion identification system 102. Communication subsystem 112 may receive the first motion data from an inertial sensor located outside of the controller. For example, the controller may be located on a device that is not attached to the operator's arm. However, the inertial sensor may be placed on the operator's arm. The inertial sensor may transmit measurements to communication subsystem 112 hosted on a device (e.g., a smart phone, a laptop or another suitable mobile device). Communication subsystem 112 may pass the received motion data or a pointer to the received motion data in memory to motion matching subsystem 114.

Figure 3:
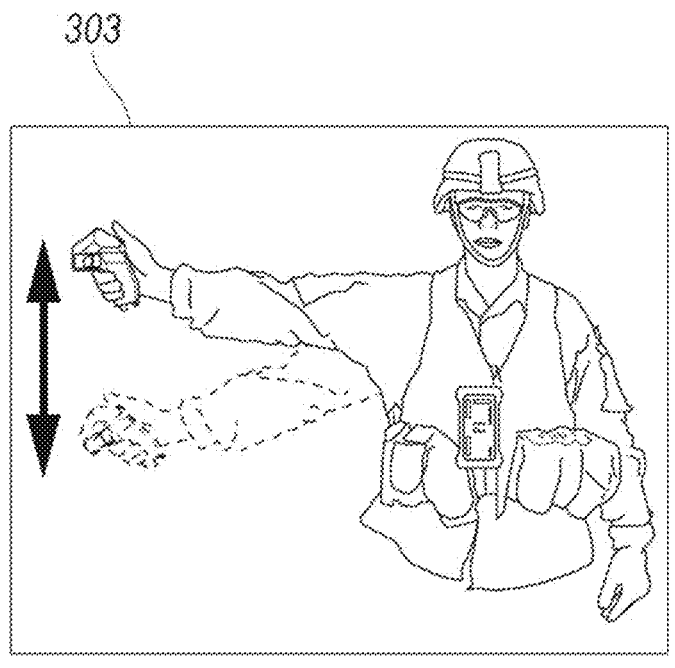
FIG. 3 illustrates possible motion-induced commands, in accordance with one or more embodiments of this disclosure.
Figure 3:
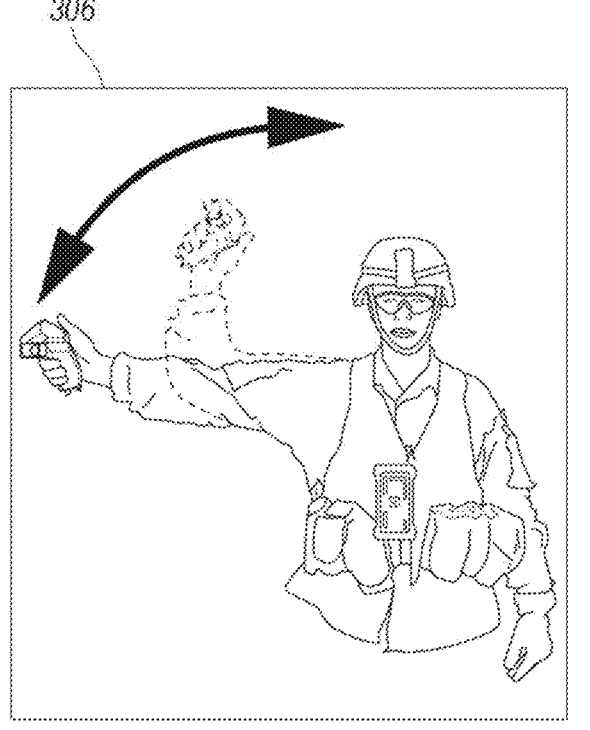
Figure 3:
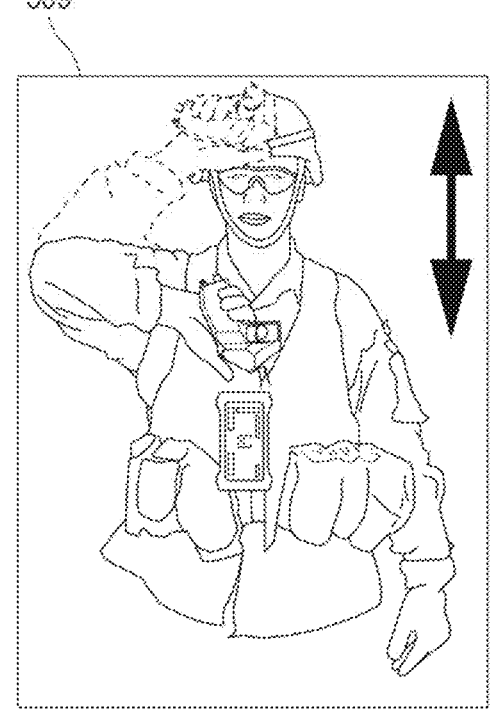

Motion matching subsystem 114 may include software components, hardware components, or a combination of both. For example, motion matching subsystem 114 may include software components that access data in memory and/or storage and may use one or more processors to perform its operations. Motion matching subsystem 114 may determine that the first motion data corresponds to a candidate motion-induced command. FIG. 3 illustrates possible motion-induced commands and the location of the controller (e.g., on the operator's hand). Illustration 303 shows one command that may be detectable by the controller. Illustration 303 shows an operator moving his/her hand up and down. That movement may be detected by inertial sensor attached to the operator's arm. The inertial sensor may be part of a controller or may be separate from the controller.

As discussed above, the inertial sensor may include a combination of magnetometer, accelerometer, and/or gyroscope. Based on the movement of the operator's arm, the combination of those instruments may detect one or more of an acceleration, angular velocity, or heading. In some embodiments, the inertial sensor may generate a combination of those measurements (e.g., acceleration and angular velocity, acceleration and heading, or angular velocity and heading). Thus, the inertial sensor may send the detected measurements to motion matching subsystem 114. Illustration 306 and illustration 309 each show another example of a motion-induced command.

Figure 4:
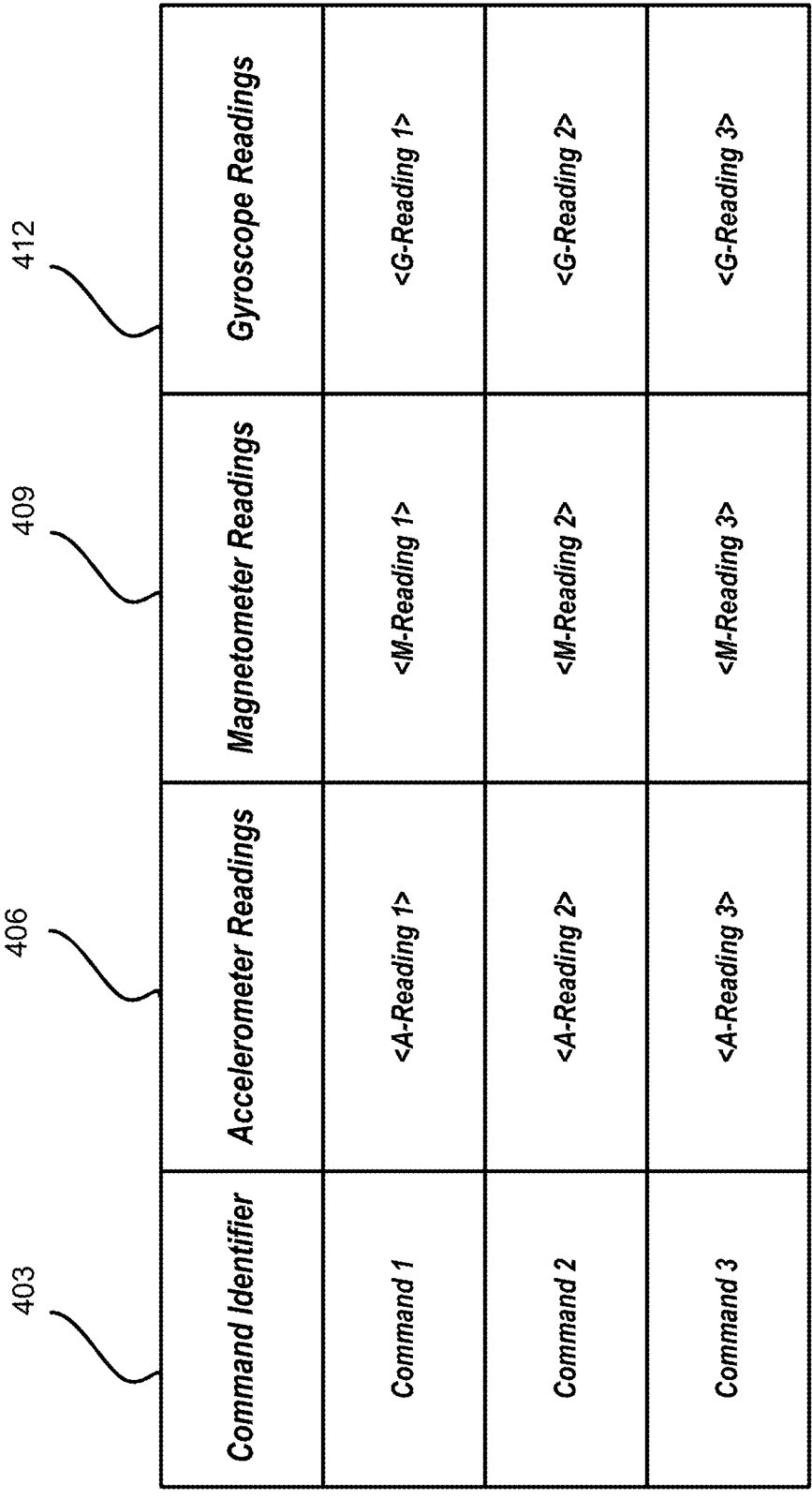
FIG. 4 illustrates an excerpt of a motion-induced command table, in accordance with one or more embodiments of this disclosure.

When motion matching subsystem 114 receives the first motion data (e.g., the measurements from the inertial sensor), motion matching subsystem 114 may determine whether the first motion data corresponds to a candidate motion-induced command. For example, motion identification system 102 may store possible commands that may be interpreted by the controller and sent to each unmanned vehicle. FIG. 4 illustrates an excerpt of a motion-induced command table 400 that enables storing motion-induced commands. Column 403 may store a command identifier. For example, a command identifier may be "Move in a direction" which correspond to a command instructing a vehicle (e.g., an unmanned vehicle) to travel in the specified direction.

Column 406 may include an accelerometer reading associated with the motion-induced command. For example, the accelerometer reading may have been added to the table when the command was added to the controller as a supported command. That is, the designer of the system may have used the motion and recorded accelerometer readings while creating the command. Thus, when an operator performs the command, the reading of the accelerometer may match the reading of the accelerometer when the command was created. Column 409 may include magnetometer readings of when the command was created and column 412 may store gyroscope readings of when the command was created. Thus, motion matching subsystem 114 may compare the first motion data received from the inertial sensor of the controller with readings stored in table 400 to determine whether the first motion data may be a candidate for being a motion-induced command. In some embodiments, the comparison may include comparing one or more of the accelerometer readings, magnetometer readings and gyroscope readings. In some embodiments the comparison may include combinations of readings (e.g., accelerometer and magnetometer, accelerometer and gyroscope, or magnetometer and gyroscope). In some embodiments, all three readings may be used in the comparison operation.

Motion matching subsystem 114 may receive, from an inertial sensor, second motion data. The second motion data may include a second acceleration and a second angular velocity. The inertial sensor may be worn by an operator. The inertial sensor (e.g., inertial sensor 200) may measure the acceleration and the angular velocity of a torso of the operator. In some embodiments, the inertial sensor may measure one or more of the accelerometer readings, magnetometer readings, gyroscope readings. In some embodiments, the inertial sensor may measure combinations of readings (e.g., accelerometer and magnetometer, accelerometer and gyroscope, or magnetometer and gyroscope). In some embodiments, all three readings may be measured by the inertial sensor.

Motion matching subsystem 114 may determine, based on the first acceleration, the second acceleration, the first angular velocity, and the second angular velocity, that the first motion data matches the second motion data. Motion matching subsystem 114 may perform the following operations for matching the first motion data and the second motion data. Motion matching subsystem 114 may generate an acceleration difference based on subtracting the second acceleration from the first acceleration. That is, motion matching subsystem 114 may subtract the acceleration received from the inertial sensor attached to the operator's torso from the acceleration received from the controller (e.g., an inertial sensor within the controller attached to the operator's arm).

Furthermore, motion matching subsystem 114 may generate an angular velocity difference based on subtracting the second angular velocity from the first angular velocity. That is, motion matching subsystem 114 may subtract the angular velocity received from the inertial sensor attached to the operator's torso from the angular velocity received from the controller (e.g., an inertial sensor within the controller attached to the operator's arm). In some embodiments, motion matching subsystem 114 may generate a heading difference based on subtracting the heading within the second motion data from the heading within the first motion data. That is, motion matching subsystem 114 may subtract the heading received from the inertial sensor attached to the operator's torso from the heading received from the controller (e.g., an inertial sensor within the controller attached to the operator's arm).

Based on the difference calculations, motion matching subsystem 114 may determine that the acceleration difference does not meet an acceleration threshold and the angular velocity difference does not meet an angular velocity threshold. For example, motion matching subsystem 114 may compare the acceleration difference with the acceleration threshold. If the acceleration difference is less than (or equal to or less than) the acceleration threshold, motion matching subsystem 114 may determine that the acceleration threshold has not been met. Furthermore, if the angular velocity difference is less than (or equal to or less than) the angular velocity threshold, motion matching subsystem 114 may determine that the angular velocity threshold has not been met. Based on determining that the acceleration difference does not meet the acceleration threshold and the angular velocity difference does not meet the angular velocity threshold, motion matching subsystem 114 may determine that the first motion data matches the second motion data.

Based on determining that the first motion data matches the second motion data, motion matching subsystem 114 may determine that the candidate motion-induced command corresponds to a motion-induced error and may refrain from transmitting the candidate motion-induced command to one or more vehicles. That is, motion matching subsystem 114 may determine that the operator and the operator's hand are moving the same way (e.g., the operator is riding in a car or a helicopter). Thus, motion matching subsystem 114 may determine that the operator does not intend to create a motion-induced command, but that the inertial sensors are just reading the operator's movement. As a result, motion matching subsystem 114 may refrain from generating a motion-induced command or sending that command to one or more unmanned vehicles.

In some embodiments, motion matching subsystem 114 may determine that the first motion data does not match the second motion data. For example, the arm/hand of the operator may move different from the body of the operator. In this case, motion matching subsystem may pass the first motion data and the second motion data to command generation subsystem 116. Command generation subsystem 116 may include software components, hardware components, or a combination of both. For example, command generation subsystem 116 may include software components that access data in memory and/or storage and may use one or more processors to perform its operations.

Based on determining that the first motion data does not match the second motion data, command generation subsystem 116 may generate a motion-induced command and transmit the motion-induced command to one or more unmanned vehicles. For example, if the hand/arm of the operator holding a controller is moving in a different way than the body/torso of the operator. Thus, command generation subsystem 116 may determine that the operator's intent is to generate a command for an unmanned vehicle.

Command generation subsystem 116 may then generate a motion-induced command based on the received motion data and may adjust the motion data based on the movement of the operator's body. For example, the operator may be riding onboard a helicopter that is circling a specific location. The operator may want to send a motion-induced command to an unmanned ground vehicle. The command may instruct the vehicle to move in a particular direction. Thus, command generation subsystem 116 may adjust the command for the helicopter's movement.

Command generation subsystem 116 may perform the following operations when adjusting received motion data. For example, command generation subsystem 116 may generate a third acceleration based on subtracting the second acceleration from the first acceleration. That is, command generation subsystem 116 may subtract the acceleration received from an inertial sensor (e.g., attached to an operator's torso) from acceleration received from the controller (e.g., the inertial sensor built into the controller).

Furthermore, command generation subsystem 116 may generate a third angular velocity based on subtracting the second angular velocity from the first angular velocity. That is, command generation subsystem 116 may subtract the angular velocity received from an inertial sensor (e.g., attached to an operator's torso) from angular velocity received from the controller (e.g., the inertial sensor built into the controller). In some embodiments, command generation subsystem 116 may subtract a heading received from an inertial sensor (e.g., attached to an operator's torso) from a heading received from the controller (e.g., the inertial sensor built into the controller). Thus, command generation subsystem 116 may generate an adjusted acceleration, angular velocity, and/or heading. Thus, command generation subsystem 116 may generate the motion-induced command based on the third acceleration and the third angular velocity. That is, command generation subsystem 116 may use adjusted acceleration, angular velocity, and/or heading to generate a command for one or more unmanned vehicles.

In some embodiments, there may be multiple acceleration readings, angular velocity readings, and/or heading readings (e.g., when a motion-induced command requires multiple motions as shown in FIG. 3). Thus, command generation subsystem 116 may synchronize the timing of the readings before comparing with the readings in the table. For example, the motion-induced command may be a command illustrated in illustration 303. To execute the command, the operator has to lower his/her hand and then raise it again. In this case, there may be three acceleration readings. The first acceleration reading may be when the operator is lowering his hand, the second acceleration reading may be when the hand is stationary, and the third acceleration reading may be when the hand is being raised back up. Furthermore, there may be multiple heading and/or angular velocity readings. Command generation subsystem 116 may match the readings in sequence to the stored readings (e.g., as stored in table 400 of FIG. 4).

In some embodiments, it may be useful for the controller to determine when to disable detection of motion-induced commands. For example, if an operator experiences a large acceleration and/or angular velocity event (e.g., as a result of a catastrophic event such as an operator being thrown out of a vehicle or a large force being applied to the operator), command generation subsystem 116 may determine to stop detection of motion-induced commands. In another example, if the controller is thrown off the operator's hand/arm, command generation subsystem 116 may prevent further motion-induced commands until the controller is recovered and the operator is authenticated.

Thus, command generation subsystem 116 may determine that the first acceleration meets an acceleration threshold, or the first angular velocity meets an angular velocity threshold. Each threshold may be set based on requirements of a mission or may be set at the factory. That is, an operator may be able to set either threshold using a graphical user interface of the controller. Based on determining that the first acceleration meets the acceleration threshold, or the first angular velocity meets the angular velocity threshold, command generation subsystem 116 may stop detection of new motion-induced commands from the controller.

Figure 5:
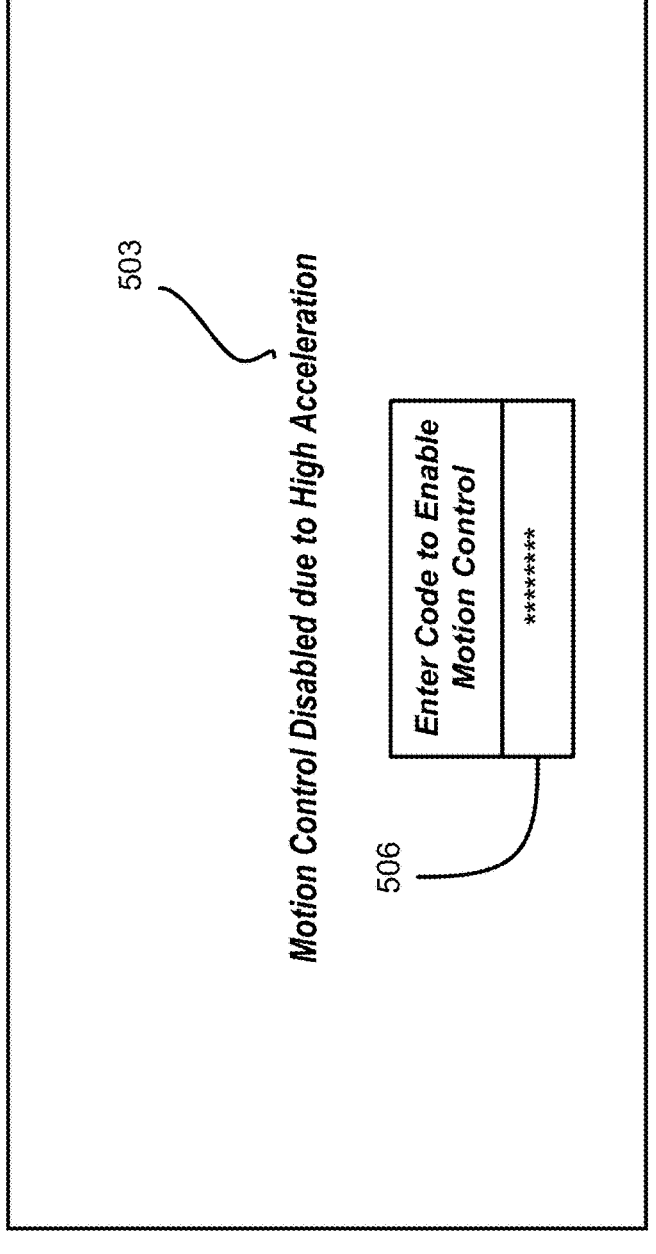
FIG. 5 illustrates a display screen for re-enabling motion control, in accordance with one or more embodiments of this disclosure.

In some embodiments, command generation subsystem 116 may give the operator an option to reenable motion-induced commands. FIG. 5 shows screen 500 that may be used to reenable further motion-induced commands. Prompt 503 informs the operator the reason for the controller to be disabled. Although prompt 503 illustrates that motion control is disabled due to high acceleration, prompt 503 may indicate other reasons for motion control being disabled (e.g., high angular velocity or excessive changes in heading). Thus, command generation subsystem 116 may generate, for display on the controller, a selectable option to enable detecting the new motion-induced commands (e.g., option 506). In response to receiving a selection of the selectable option, command generation subsystem 116 may enable detection of the new motion-induced commands. In some embodiments, command generation subsystem 116 may require an input of a code to reenable motion control.

Computing Environment

Figure 6:
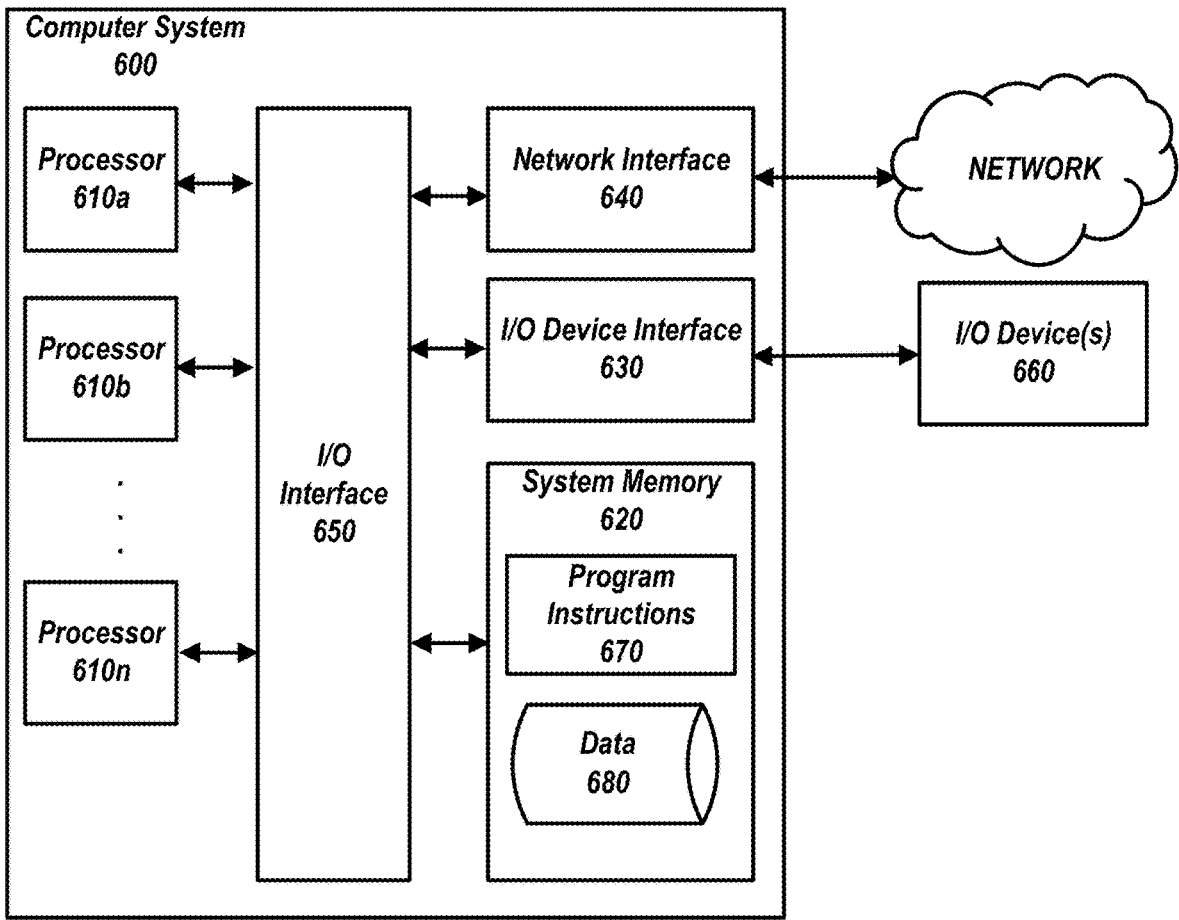
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system. The computing system may be hosted on a controller or another suitable device. A person skilled in the art would understand that those terms may be used interchangeably. The components of FIG. 6 may be used to perform some, or all, operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows described herein, may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script or code). A computer program may be written in a programming language, including compiled or interpreted languages, or declarative or procedural languages. A computer program may include a unit suitable for use in a computing environment, including as a stand-alone program, a module, a component or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine-readable storage medium, a machine-readable storage substrate, a memory device, or any combination thereof. Non-transitory computer readable storage medium may include non-volatile memory (e.g., flash memory, ROM, PROM, EPROM, EEPROM), volatile memory (e.g., random access memory (RAM), static random-access memory (SRAM), synchronous dynamic RAM (SDRAM)), bulk storage memory (e.g., CD-ROM and/or DVD-ROM, hard drives) or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include, or be a combination of, a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS) or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided or other additional functionality may be available.

Operation Flow

Figure 7:
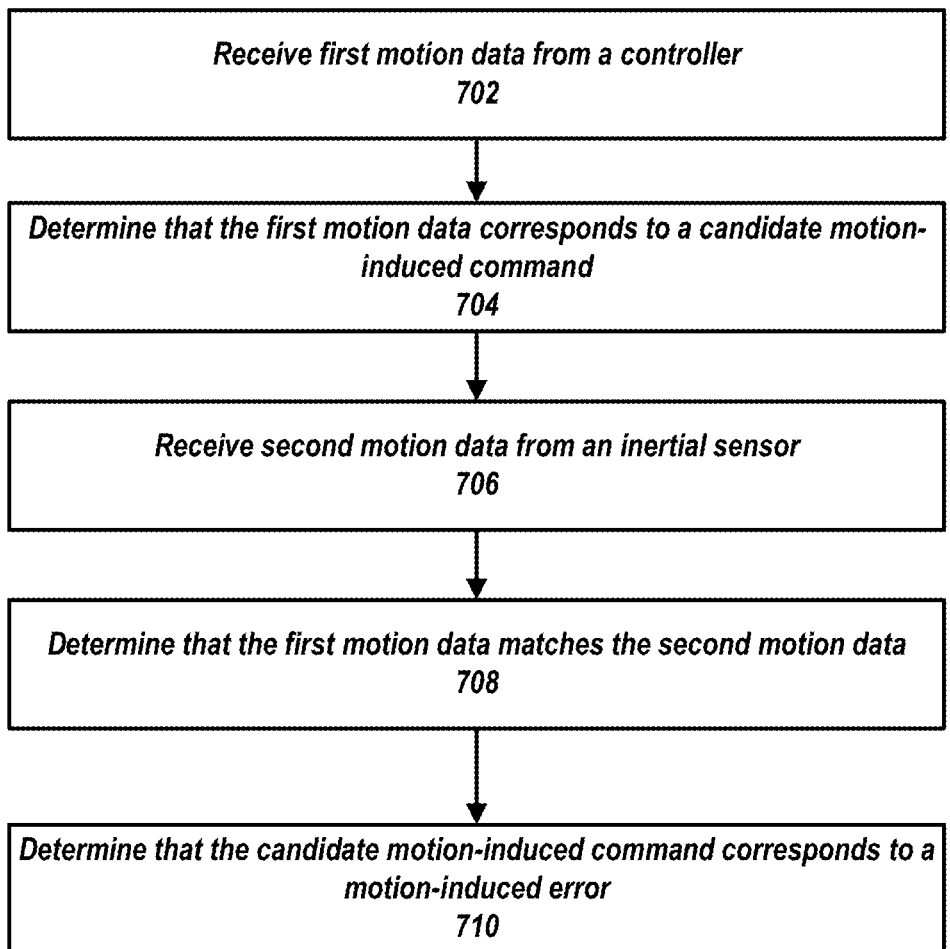
FIG. 7 is a flowchart of operations for detecting motion-induced errors received from inertial-type input devices, in accordance with one or more embodiments of this disclosure.

FIG. 7 is a flowchart 700 of operations detecting motion-induced errors received from inertial-type input devices. The operations of FIG. 7 may use components described in relation to FIG. 6. In some embodiments, motion identification system 102 may include one or more components of computing system 600. At 702, motion identification system 102 receives first motion data from a controller. For example, the motion identification system may receive the first motion data from a device being worn by the operator. Motion identification system 102 may receive the first motion data over network 150 using network interface 640 or through a bus shared between the controller and the motion identification system 102.

At 704, motion identification system 102 determines that the first motion data corresponds to a candidate motion-induced command. Motion identification system 102 may use one or more processors 610a, 610b, and/or 610n to perform the determination. At 706, motion identification system 102 receives second motion data from an inertial sensor. Motion identification system 102 may receive the second motion data over network 150 using network interface 640 or through a bus shared between the controller and the motion identification system 102.

At 708, motion identification system 102 determines that the first motion data matches the second motion data. Motion identification system 102 may use one or more processors 610a, 610b, and/or 610n to perform the determination. At 710, motion identification system 102 determines that the candidate motion-induced command corresponds to a motion-induced error. Motion identification system 102 may use one or more processors 610a, 610b and/or 610n to perform the generation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a controller, first motion data, wherein the first motion data comprises a first acceleration and a first angular velocity; determining that the first motion data corresponds to a candidate motion-induced command; receiving, from an inertial sensor, second motion data, wherein the second motion data comprises a second acceleration and a second angular velocity; determining, based on the first acceleration, the second acceleration, the first angular velocity, and the second angular velocity, and that the first motion data matches the second motion data; and based on determining that the first motion data matches the second motion data, determining that the candidate motion-induced command corresponds to a motion-induced error and refraining from transmitting the candidate motion-induced command to one or more vehicles.

2. Any of the preceding embodiments, further comprising, based on determining that the first motion data does not match the second motion data, generating a motion-induced command and transmitting the motion-induced command to one or more unmanned vehicles.

3. Any of the preceding embodiments, wherein generating the motion-induced command further comprises: generating a third acceleration based on subtracting the second acceleration from the first acceleration; generating a third angular velocity based on subtracting the second angular velocity from the first angular velocity; and generating the motion-induced command based on the third acceleration and the third angular velocity.

4. Any of the preceding embodiments, further comprising: determining that the first acceleration meets an acceleration threshold or the first angular velocity meets an angular velocity threshold; and based on determining that the first acceleration meets the acceleration threshold or the first angular velocity meets the angular velocity threshold, stopping detection of new motion-induced commands from the controller.

5. Any of the preceding embodiments, further comprising: generating for display on the controller a selectable option to enable detecting the new motion-induced commands, and in response to receiving a selection of the selectable option, enabling detection of the new motion-induced commands.

6. Any of the proceeding embodiments, wherein the controller comprises a second inertial sensor and receives motion-induced commands to control the one or more vehicles, and wherein the second inertial sensor generates measurements of acceleration and angular velocity of the controller.

7. Any of the preceding embodiments, wherein the inertial sensor is attached to an operator, and wherein the inertial sensor generates measurements of acceleration and angular velocity of a torso of the operator.

8. Any of the preceding embodiments, wherein determining, based on the first acceleration, the second acceleration, the first angular velocity, and the second angular velocity, that the first motion data matches the second motion data comprises: generating an acceleration difference based on subtracting the second acceleration from the first acceleration; generating an angular velocity difference based on subtracting the second angular velocity from the first angular velocity; determining that the acceleration difference does not meet an acceleration threshold and the angular velocity difference does not meet an angular velocity threshold; and based on determining that the acceleration difference does not meet the acceleration threshold and the angular velocity difference does not meet the angular velocity threshold, determining that the first motion data matches the second motion data.

9. A tangible, non-transitory, machine-readable medium storing instructions that, when executed by a data processing apparatus, cause the data processing apparatus to perform operations comprising those of any of embodiments 1-8.

10. A system comprising: one or more processors and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for detecting motion-induced errors received from inertial-type input devices, the system comprising:
one or more processors; and
a non-transitory computer-readable storage medium storing instructions which, when executed by the one or more processors, cause the one or more processors to perform operations comprising:
receiving, from a controller, first motion data;
determining that the first motion data corresponds to a candidate motion-induced command;
receiving, from an inertial sensor separate from the controller, second motion data;
determining whether the first motion data matches the second motion data;
based on determining that the first motion data matches the second motion data, determining that the candidate motion-induced command corresponds to a motion-induced error;
based on determining that the candidate motion-induced command corresponds to the motion-induced error, stopping detection of subsequent motion-induced commands from the controller, wherein the motion-induced error corresponds to an error induced by motion of a combination of the controller and the inertial sensor; and
generating for display on the controller a selectable option to enable detecting the subsequent motion-induced commands.

2. The system of claim 1, wherein the instructions further cause the one or more processors to perform operations comprising, based on determining that the first motion data matches the second motion data refraining from transmitting the candidate motion-induced command to one or more vehicles.

3. The system of claim 1, wherein determining whether the first motion data matches the second motion data comprises comparing a first acceleration from the controller with a second acceleration from the inertial sensor, and a first angular velocity from the controller with a second angular velocity from the inertial sensor.

4. The system of claim 1, wherein the instructions when executed by the one or more processors, further cause the one or more processors to perform operations comprising, in response to receiving a selection of the selectable option, enabling the detection of the subsequent motion-induced commands.

5. A method comprising:
receiving, from a controller, first motion data corresponding to a candidate motion-induced command;
receiving, from an inertial sensor separate from the controller, second motion data;
determining whether the first motion data matches the second motion data;
based on determining that the first motion data matches the second motion data, determining that the candidate motion-induced command corresponds to a motion-induced error; and
based on determining that the candidate motion-induced command corresponds to the motion-induced error, stopping detection of subsequent motion-induced commands from the controller, wherein the motion-induced error corresponds to an error induced by motion of a combination of the controller and the inertial sensor.

6. The method of claim 5, further comprising, based on determining that the first motion data matches the second motion data refraining from transmitting the candidate motion-induced command to one or more vehicles.

7. The method of claim 5, further comprising determining that the first motion data matches the second motion data based on a first acceleration associated with the controller, a second acceleration associated with the inertial sensor, a first angular velocity associated with the controller, and a second angular velocity associated with the inertial sensor.

8. The method of claim 7, wherein the inertial sensor is being worn by an operator and wherein the second acceleration is torso acceleration of the operator, and the second angular velocity is torso angular velocity of the operator.

9. The method of claim 7, wherein the inertial sensor is attached to a vehicle an operator is riding and wherein the second acceleration is vehicle acceleration of the vehicle and the second angular velocity is vehicle angular velocity of the vehicle.

10. The method of claim 7, wherein determining, based on the first acceleration, the second acceleration, the first angular velocity, and the second angular velocity, that the first motion data matches the second motion data comprises:
  generating an acceleration difference based on subtracting the second acceleration from the first acceleration;
  generating an angular velocity difference based on subtracting the second angular velocity from the first angular velocity;
  determining that the acceleration difference does not meet an acceleration threshold and the angular velocity difference does not meet an angular velocity threshold; and
  based on determining that the acceleration difference does not meet the acceleration threshold and the angular velocity difference does not meet the angular velocity threshold, determining that the first motion data matches the second motion data.

11. The method of claim 5, further comprising:
  generating for display on the controller a selectable option to enable detecting the subsequent motion-induced commands; and
  in response to receiving a selection of the selectable option, enabling the detection of the subsequent motion-induced commands.

12. The method of claim 5, wherein the controller comprises a second inertial sensor and detects motion-induced commands to control one or more vehicles, and wherein the second inertial sensor generates measurements of acceleration and angular velocity of the controller.

13. A non-transitory, computer-readable medium comprising instructions for detecting motion-induced errors received from inertial-type input devices, that when executed by one or more processors, cause the one or more processors to perform operations comprising:
  receiving, from a controller, first motion data corresponding to a candidate motion-induced command;
  receiving, from an inertial sensor separate from the controller, second motion data;
  determining whether the first motion data matches the second motion data;
  based on determining that the first motion data matches the second motion data, determining that the candidate motion-induced command corresponds to a motion-induced error; and
  based on determining that the candidate motion-induced command corresponds to a motion-induced error, stopping detection of subsequent motion-induced commands from the controller, wherein the motion-induced error corresponds to an error induced by motion of a combination of the controller and the inertial sensor.

14. The non-transitory, computer-readable medium of claim 13, wherein the first motion data comprises a first acceleration and a first angular velocity and the second motion data comprises a second acceleration and a second angular velocity.

15. The non-transitory, computer-readable medium of claim 14, wherein the instructions for determining, based on the first acceleration, the second acceleration, the first angular velocity, and the second angular velocity, that the first motion data matches the second motion data further cause the one or more processors to perform operations comprising:
  generating an acceleration difference based on subtracting the second acceleration from the first acceleration;
  generating an angular velocity difference based on subtracting the second angular velocity from the first angular velocity;
  determining that the acceleration difference does not meet an acceleration threshold and the angular velocity difference does not meet an angular velocity threshold; and
  based on determining that the acceleration difference does not meet the acceleration threshold and the angular velocity difference does not meet the angular velocity threshold, determining that the first motion data matches the second motion data.

16. The non-transitory, computer-readable medium of claim 14, wherein the instructions further cause the one or more processors to generate a motion-induced command based on the first motion data not matching the second motion data.

17. The non-transitory, computer-readable medium of claim 16, wherein the instructions for generating the motion-induced command further cause the one or more processors to perform operations comprising:
  generating a third acceleration based on subtracting the second acceleration from the first acceleration;
  generating a third angular velocity based on subtracting the second angular velocity from the first angular velocity; and
  generating the motion-induced command based on the third acceleration and the third angular velocity.

18. The non-transitory, computer-readable medium of claim 17, wherein the instructions further cause the one or more processors to perform operations comprising:
  generating for display on the controller a selectable option to enable detecting the subsequent motion-induced commands; and
  in response to receiving a selection of the selectable option, enabling the detection of the subsequent motion-induced commands.

19. The non-transitory, computer-readable medium of claim 13, wherein the controller comprises a second inertial sensor and receives motion-induced commands to control one or more vehicles, and wherein the second inertial sensor generates measurements of acceleration and angular velocity of the controller.

20. The non-transitory, computer-readable medium of claim 13, wherein the inertial sensor is attached to a vehicle an operator is riding and wherein the second motion data is vehicle motion data.

\* \* \* \* \*